United States Patent
Kawai et al.

(10) Patent No.: US 6,788,450 B2
(45) Date of Patent: Sep. 7, 2004

(54) ELECTROPHORETIC DEVICE, DRIVING METHOD OF ELECTROPHORETIC DEVICE, AND ELECTRONIC APPARATUS

(75) Inventors: Hideyuki Kawai, Suwa (JP); Hirokazu Yamamoto, Fujisawa (JP)

(73) Assignee: Seiko Epson Corporation (JP)

( * ) Notice: Subject to any disclaimer, the term of this patent is extended or adjusted under 35 U.S.C. 154(b) by 83 days.

(21) Appl. No.: 10/102,609

(22) Filed: Mar. 19, 2002

(65) Prior Publication Data

US 2002/0150827 A1 Oct. 17, 2002

(30) Foreign Application Priority Data

Mar. 19, 2001 (JP) .......................................... 2001-077837
Mar. 15, 2002 (JP) .......................................... 2002-072310

(51) Int. Cl.[7] .......................... G02B 26/00; G02B 6/16; G09G 3/34
(52) U.S. Cl. ...................... 359/296; 345/107; 385/142
(58) Field of Search .......................... 359/296; 345/107, 345/105, 108, 84; 385/141, 142; 430/31; 252/572

(56) References Cited

U.S. PATENT DOCUMENTS

| | | | | |
|---|---|---|---|---|
| 4,298,448 A | * | 11/1981 | Muller et al. | 359/296 |
| 6,504,524 B1 | * | 1/2003 | Gates et al. | 345/107 |
| 6,529,676 B2 | * | 3/2003 | Eggleton et al. | 385/142 |
| 6,597,340 B1 | * | 7/2003 | Kawai | 345/107 |
| 2002/0150827 A1 | * | 10/2002 | Kawai et al. | 430/20 |

* cited by examiner

Primary Examiner—Loha Ben
(74) Attorney, Agent, or Firm—Harness, Dickey & Pierce, P.L.C.

(57) ABSTRACT

There is provided an electrophoretic device which comprises an electrophoretic layer containing dispersion medium and electrophoretic particles dispersed in the dispersion medium, controls the position of the electrophoretic particles according to the electric potential applied to electrodes, and can maintain the electrophoretic particles at a desired position for a long time by using the dispersion medium formed of mixture consisting of a plurality of substances having small mutual solubility.

24 Claims, 8 Drawing Sheets

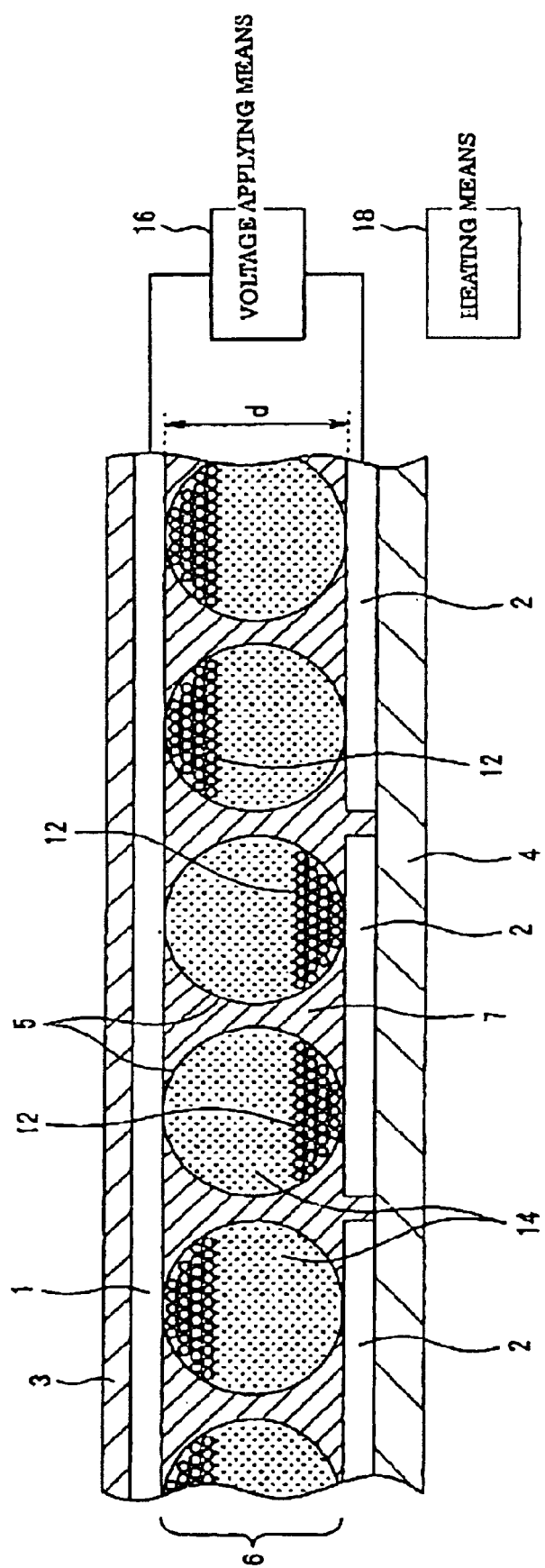
[FIG. 1]

[FIG. 2]
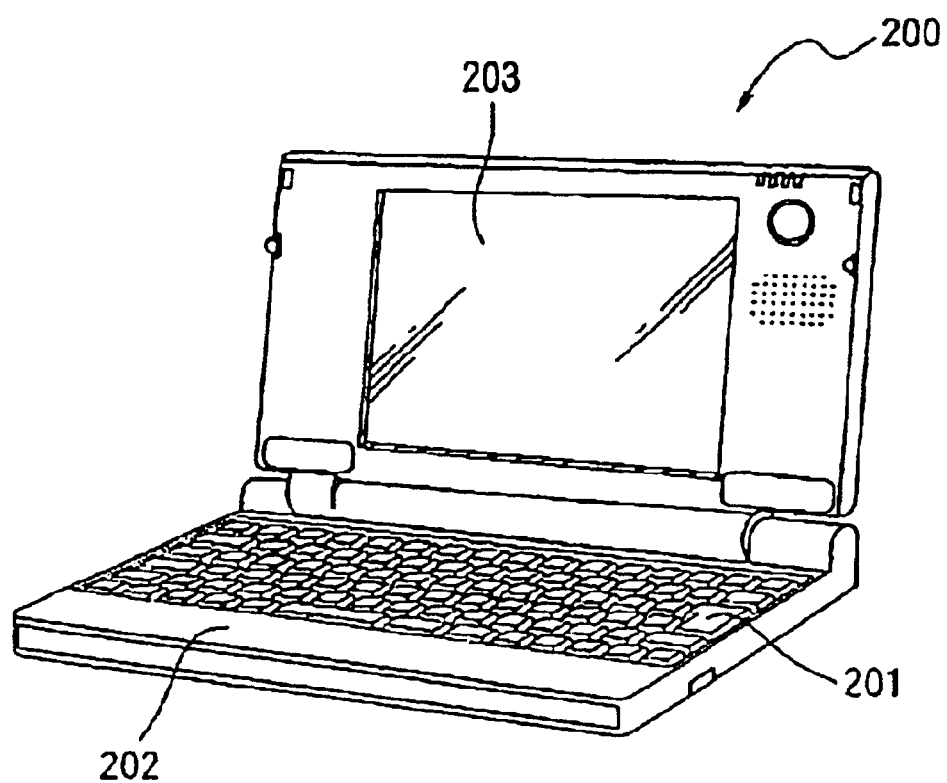

[FIG.3]
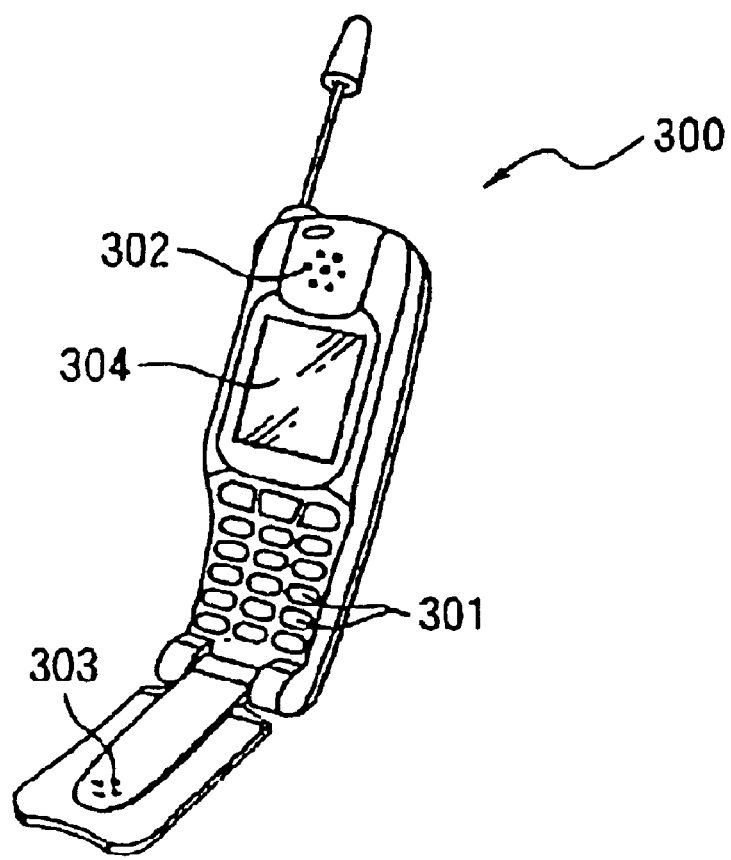

[FIG. 4]
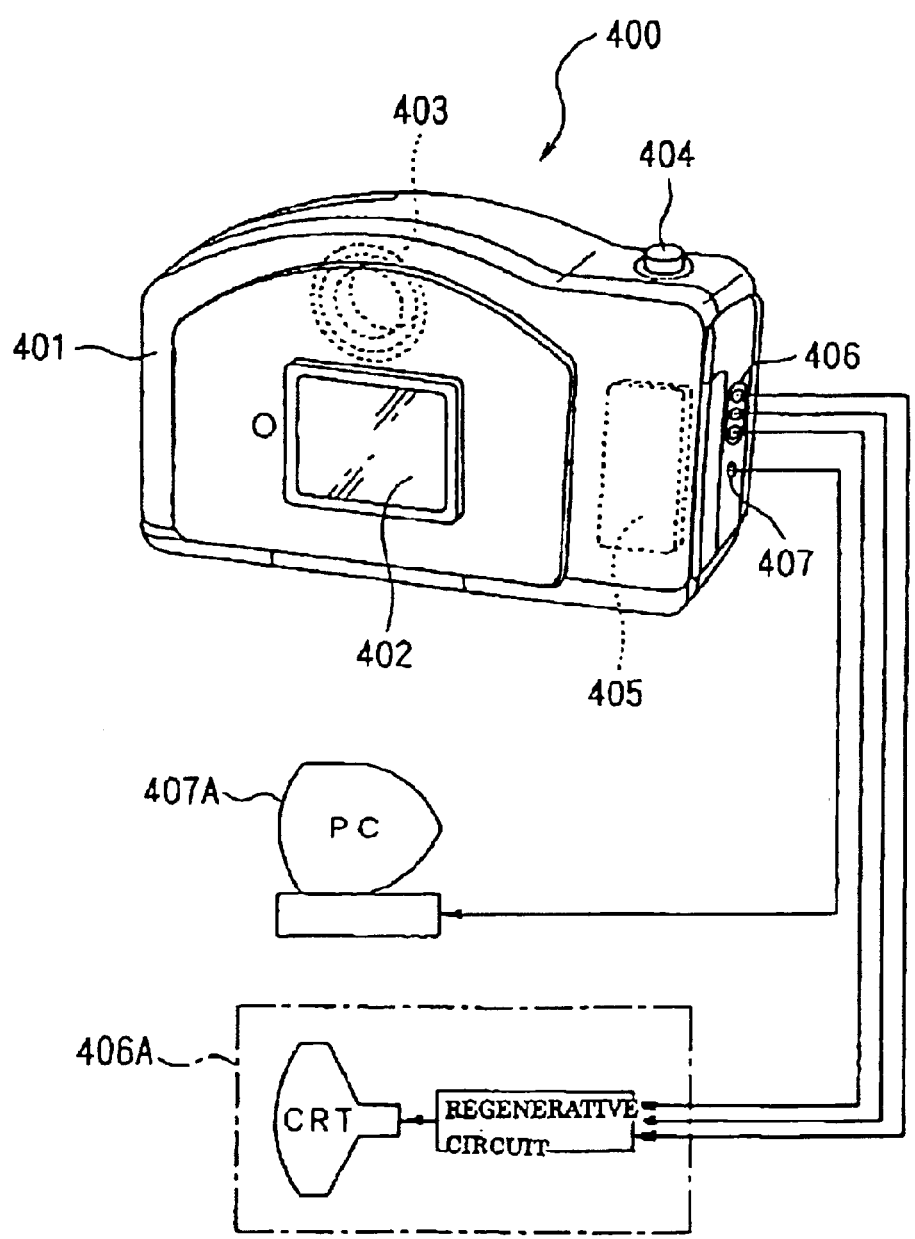

[FIG. 5]
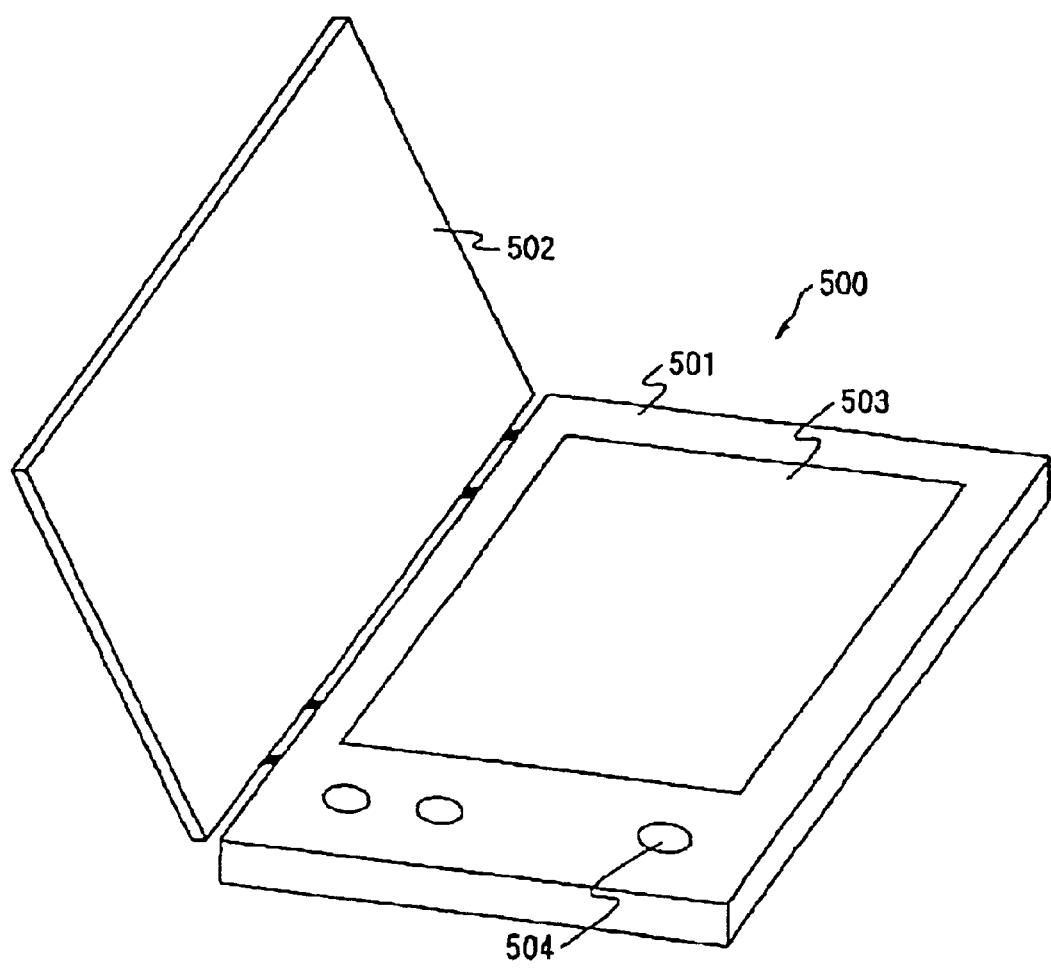

[FIG. 6]
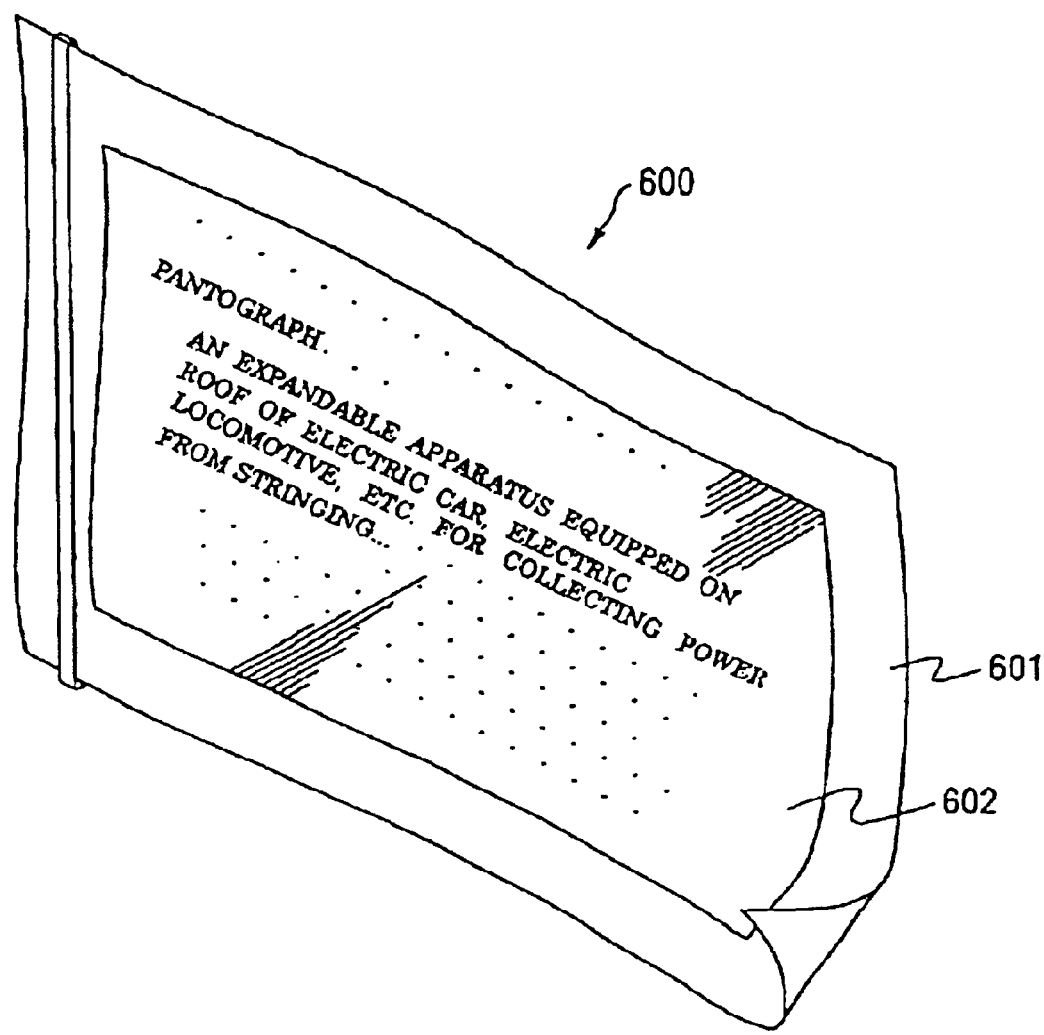

[FIG. 7]
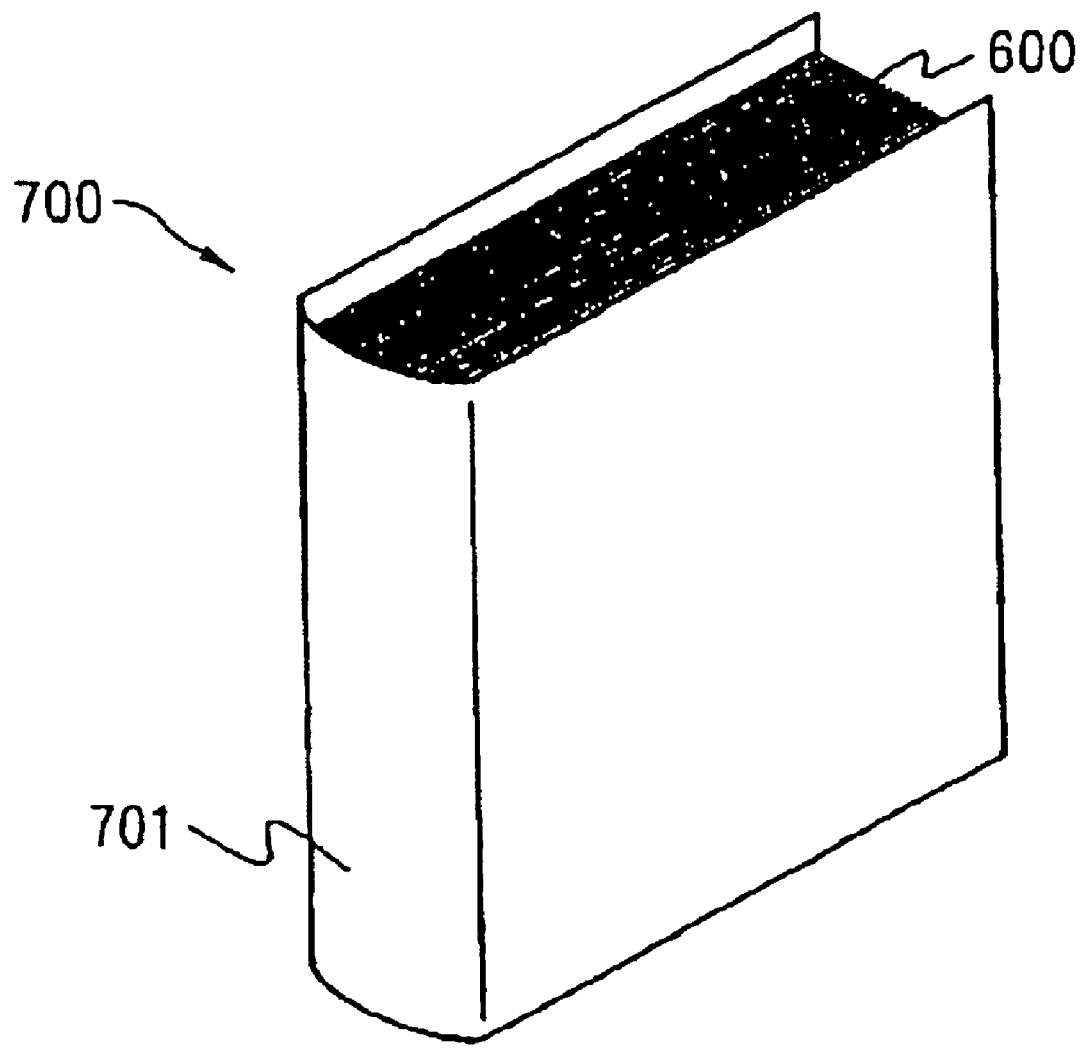

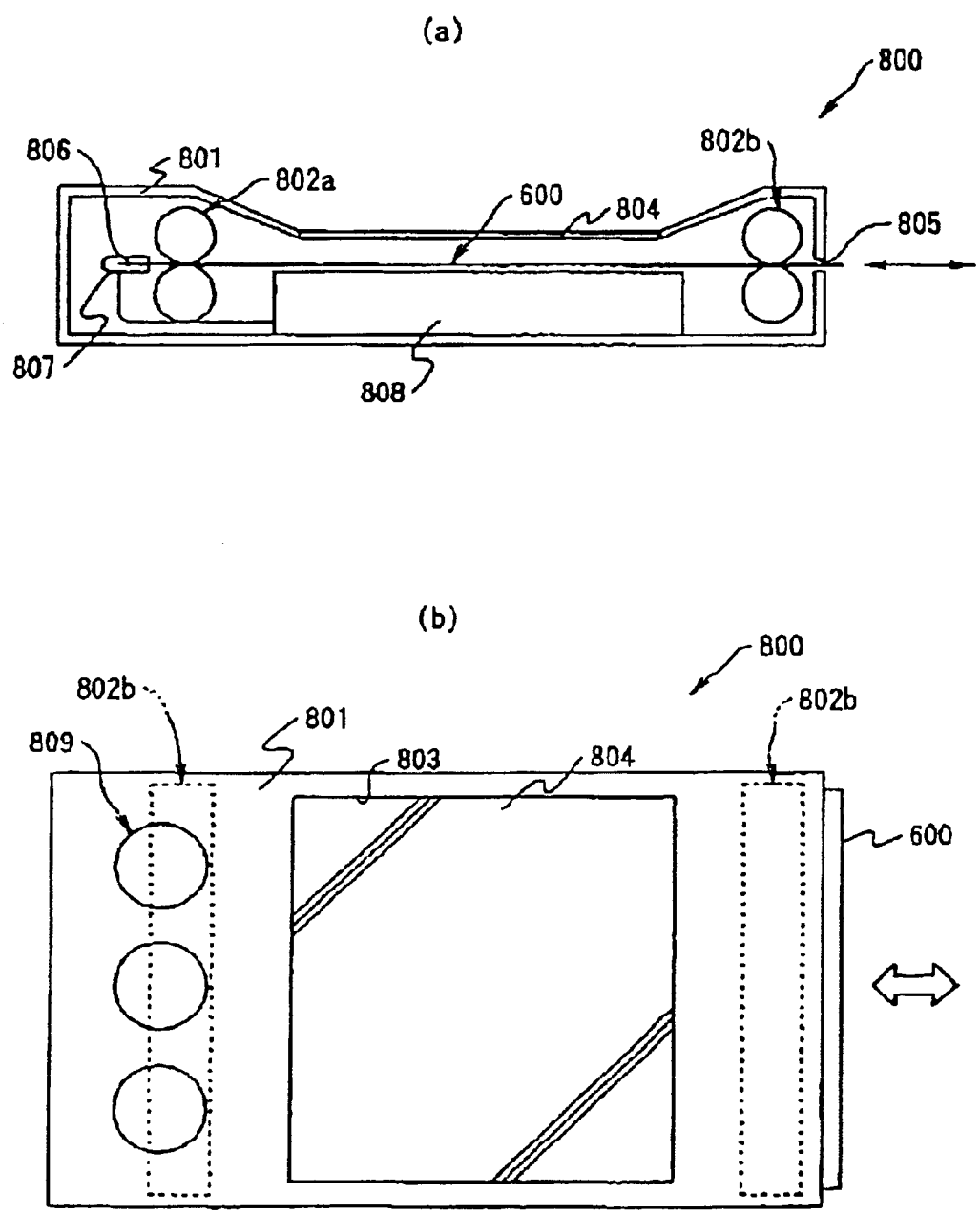
[FIG. 8]

ELECTROPHORETIC DEVICE, DRIVING METHOD OF ELECTROPHORETIC DEVICE, AND ELECTRONIC APPARATUS

TECHNICAL FIELD OF THE INVENTION

The present invention relates to an electrophoretic device, a driving method thereof, and an electronic apparatus provided therewith, and more in particular, it relates to an electrophoretic device excellent in visibility and contrast characteristic and having consistent display maintaining characteristic for a long time, a driving method thereof, and an electronic apparatus provided therewith.

DESCRIPTION OF THE RELATED ART

Conventional electrophoretic display devices utilizing changes in a distribution condition of electrophoretic particles dispersed in dispersion medium by applying the voltage between a pair of electrodes facing each other including one in which electrophoretic dispersive solution containing dispersion medium and electrophoretic particles is placed in an area which is provided, for example, on a base body and demarcated by bulkheads, and is used as an electrophoretic layer, and one in which a micro capsule accommodating electrophoretic dispersive solution therein is used in place of provision of bulkheads.

Generally speaking, if the above electrophoretic device is used for the electrophoretic display device, desired display is performed by mixing dye in the dispersion medium, and by the contrast of the display color of the dispersion medium with the dye mixed therein and the display color of electrophoretic particles.

However, in some combinations of the display color of the dispersion medium with the display color of the electrophoretic particles, the display color of the electrophoretic particles can be observed by transmitting the colored dispersion medium if electrophoretic particles are located opposite to observation side when viewed from the observation side of the display device, and in particular, the display color of the electrophoretic particles is dark, for example, blackish, its trend becomes conspicuous, and the electrophoretic display device has not been sufficient in visibility, contrast characteristic, etc.

If the electrophoretic device is used for a display device such as an electronic paper which must maintain the display content for a long time, the distribution condition of electrophoretic particles in electrophoretic dispersive solution corresponding to the display content must be maintained for a long time.

The present invention is thus made paying attention to unsolved problems, and the object of the present invention is to provide an electrophoretic device which is capable of improving the visibility and the contrast characteristic and maintaining the distribution condition of electrophoretic particles for a long time, and suitable for a display device, and a method for driving the electrophoretic device, and an electronic apparatus having the electrophoretic device.

In order to achieve the above object, the electrophoretic device of the present invention is characterized in that it comprises the electrophoretic layer containing the dispersion medium and the electrophoretic particles dispersed in this dispersion medium with the position of the electrophoretic particles controlled according to the electric potential applied to the electrodes, and the dispersion medium is mixture of a plurality of substances, and the mutual solubility of these substances is low.

The electrophoretic device in which an electrophoretic layer containing the dispersion medium and electrophoretic particles dispersed in the dispersion medium is disposed between a pair of electrodes is characterized in that the dispersion medium is mixture of a plurality of substances, and the mutual solubility of these substances is low.

Here in the above electrophoretic device, at least one of the plurality of substances is preferably non-fluid at normal temperature, and fluid at non-normal temperature.

DISCLOSURE OF THE INVENTION

In the above electrophoretic device, the plurality of substances are preferably different from each other in the refractive index thereof.

In the above electrophoretic device, the dispersion medium is preferably mixture of at least one kind of substance selected among long chain alcohols including hexadecyl alcohol and octadecyl alcohol, phenols including phenol and cresol, aromatic ketones including benzophenone and benzaldehyde, decanes, and dodecanes, with at least one kind of substance selected among paraffin, waxes, or waxes mainly consisting thereof, and saturated hydrocarbons.

In the above electrophoretic device, the dispersion medium may contain dispersing agent.

In the above electrophoretic device, the dispersion medium with the electrophoretic particles dispersed therein may be sealed in an area demarcated by the bulkhead provided between the electrodes.

In the above electrophoretic device, the dispersion medium with the electrophoretic particles dispersed therein may be contained in a micro capsule, and sealed between the electrodes, and the micro capsule is preferably disposed uniform in thickness and flat between the electrodes.

The above electrophoretic device preferably comprises a heating means for heating the dispersion medium.

The above electrophoretic device may comprise a cooling means for cooling the dispersion medium.

The electrophoretic device preferably applies the electric potential to the electrodes with the electrophoretic layer in a non-normal temperature condition.

The driving method of the electrophoretic device of the present invention is characterized in that the electrophoretic layer contains the dispersion medium and electrophoretic particles dispersed in the dispersion medium, and the position of the electrophoretic particles is controlled according to the electric potential applied to the electrodes, and that the dispersion medium is formed of mixtures which consist of a plurality of substances and is fluid at the electrophoretically operational temperature in the electrophoretic layer while the dispersion medium is formed by the mixture which is optically opaque solid at the temperature lower than the electrophoretically operational temperature, and the electric potential is applied to the electrodes with the temperature of the electrophoretic layer is set to be the electrophoretically operational temperature.

The method for driving the electrophoretic device of the present invention in which the electrophoretic layer containing the dispersion medium and the electrophoretic particles dispersed in the dispersion medium is disposed between a pair of electrodes is characterized in that the dispersion medium is formed of a mixture of a plurality of substances which is fluid at the electrophoretically operational temperature for performing the electrophoretic operation in the electrophoretic layer, and optically opaque solid at the temperature lower than the electrophoretically operational temperature, and the electric potential is applied to the electrodes with the temperature of the electrophoretic layer set to be the electrophoretic operational temperature.

In the driving method of the above electrophoretic device and the above electrophoretic device, the mixture of a plurality of substances is used as the dispersion medium, and the mixture of low mutual solubility of the plurality of substances is used. The mutual solubility of the plurality of substances forming the dispersion medium is small, and the liquid does not become homogeneous, and thus, the transmissivity is degraded. For example, if the electrophoretic particles are located on the distal side from, for example, the observation side, the electrophoretic particles cannot be visually recognized from the observation side. Thus, the contrast of the electrophoretic particles with the dispersion medium can be ensured, and the visibility can be improved.

At least one of the plurality of substances constituting the dispersion medium is non-fluid at the normal temperature and is fluid at the non-normal temperature, and as a result, the dispersion medium is non-fluid at the normal temperature. Thus, the position of the electrophoretic particles at this time can be maintained. Therefore, if used as the electrophoretic display device, the dispersion medium is heated by, for example, the heating means, and the electrophoretic particles are electrophoretically operated in a non-normal temperature to perform a desired display. After that, the dispersion medium is cooled by a cooling means not shown in the figure to be maintained at the normal temperature, and the display content can be maintained thereby.

The normal temperature here means the temperature of the environment in which the electrophoretic device in the display state is placed if the electrophoretic device of the present invention is used as the display device.

The composition of the dispersion medium can be appropriately adjusted according to the temperature of the environment in which the electrophoretic device in the display state is placed. In addition, as described below, the normal temperature generally corresponds to the room temperature.

The light scattering intensity is increased by consisting the dispersion medium of a plurality of substances much different in the refractive index, and the visibility and the contrast characteristic can be improved more as the difference in the refractive index is larger.

Dispersibility of the electrophoretic particles in the dispersion medium can be improved by mixing the dispersing agent in the dispersion medium, the zeta potential self-excited by the electrophoretic particles can be increased, the electrophoretic speed of the electrophoretic particles in applying the voltage can be increased, and as a result, the response speed can be increased.

The electronic apparatus of the present invention is characterized in that the above electrophoretic device is provided as the display body in the electronic apparatus comprising the display body and the driving circuit for feeding the drive signal to the display body.

This electronic apparatus can ensure the contrast of electrophoretic particles with the dispersion medium by providing the electrophoretic device as a display body, and can improve the visibility.

BRIEF DESCRIPTION OF THE DRAWINGS

FIG. 1 is a schematic configuration showing the configuration of an electrophoretic display device.

FIG. 2 is a perspective view showing the configuration of a mobile personal computer.

FIG. 3 is a perspective view showing the configuration of a cellular phone.

FIG. 4 is a perspective view showing the configuration of a digital still camera.

FIG. 5 is a perspective view showing the configuration of an electronic book.

FIG. 6 is a perspective view showing the configuration of an electronic paper.

FIG. 7 is a perspective view showing the configuration of an electronic notebook.

FIG. 8 shows the configuration of an electrophoretic display device having an electronic paper, and (a) is a frontal sectional view, and (b) is a plan view, respectively.

DESCRIPTION OF THE EMBODIMENTS

The embodiments of the present invention will be described with reference to the drawings.

FIG. 1 shows schematic configuration in which an electrophoretic device of the present invention is applied to the electrophoretic display device.

In the figure, numerals 1 and 2 denote transparent electrodes formed of, for example, ITO (Indium Tin Oxide) film, and the transparent electrode 2 is formed into segments of predetermined size and predetermined shape to form divided electrodes. These transparent electrodes 1 and 2 are installed facing to each other by a predetermined space d, and a transparent substrate 3 and a back substrate 4 are provided on outer sides of the transparent electrodes 1 and 2.

The electrodes 1 and 2 are not always transparent, and either of them may be transparent, and in such a case, the transparent substrate 3 is provided on the transparent electrode 1 or 2 side.

In addition, an electrophoretic layer 6 comprising a micro capsule 5 is formed in a space between the transparent electrodes 1 and 2, and the micro capsule 5 is fixed in a further uniform manner by transparent binder 7.

Dispersive solution containing charged electrophoretic particles 12, a dispersion medium 14 with the electrophoretic particles 12 dispersed therein, and dispersing agent is sealed in the micro capsule 5, and the dispersion medium 14 is prepared so as to be solid at room temperature, and liquid at predetermined working temperature higher than room temperature.

A voltage applying means 16 for applying the voltage between the transparent electrodes 1 and 2 is provided, and the electrophoretic particles 12 are subjected to electrophoretic operation by controlling the voltage applied between the transparent electrode 1 and the divided transparent electrode 2 by this voltage applying means 16. In addition, a heating means (a temperature raising means) 18 such as a heater, a hot air device and a thermal head for liquefying the dispersive medium 14 in the micro capsule 5 for constituting the electrophoretic layer 6 is provided.

And by heating the electrophoretic layer 6 to the predetermined operational temperature by a heating means 18, and controlling the voltage applied between the transparent electrode 1 and the transparent electrode 2 by a voltage applying means 16 with the dispersion medium 14 in a liquefied condition for each segment of the transparent electrode 2, electrophoretic phenomenon in which the electrophoretic particles 12 move toward either the transparent electrode 1 or the transparent electrode 2, depending on the direction of the voltage applied, occurs. In this condition, the dispersion medium 14 of the electrophoretic layer 6 is cooled and solidified, and when viewed from the transparent substrate 3 side, either white color, which is the color when the dispersion medium 14 is solidified, or the color of the electrophoretic particles 12 is displayed, and a desired image or letter is displayed by the difference of these colors.

For the electrophoretic particles 12, particles known as colored pigment except those of organic and inorganic white colors are generally used. For example, carbon black, black iron oxide, etc. are applicable for black particles. Organic pigments known as lake red and lithol red are applicable for red particles. Organic pigments known as benzine yellow and Hansa yellow are applicable for yellow particles. Inorganic pigments known as phthalocyanine blue and cobalt blue are applicable for blue particles.

In the present embodiment, different display color can be set for each micro capsule 5, and thus, the color of the electrophoretic particles 12 is selected for each micro capsule 5, and white color when the dispersion medium 14 is solidified is appropriately selected, and the electrophoretic layer 6 comprising the micro capsule 5 is formed to constitute a display device displayable in color.

Grain size of the electrophoretic particles 12 are preferably 0.1 to 5 $\mu$m, and more preferably, 0.2 to 2 $\mu$m. The grain size of the particles is determined so that excellent visibility can be obtained when the grain size is 0.1 $\mu$m or over, and electrophoresis can be ensured when the grain size is 5 $\mu$m or under.

The dispersing agent contained in the micro capsule 5 is dissolved in the dispersion medium 14, and adsorbed by the electrophoretic particles 12. This dispersing agent keeps dispersibility of the electrophoretic particles 12 in the dispersive solution, and increases the zeta potential self-excited by the electrophoretic particles 12. By increasing the zeta potential by using the dispersing agent, the electrophoretic speed of the electrophoretic particles 12 when applying the voltage can be increased, and as a result, the display speed can be increased.

Any dispersing agent is applicable so long as it demonstrates the above-described two roles, and for example, surfactant is applicable. Above all, the dispersing agent having polar groups such as sodium dodecyl sulfate, aerosol OT, and oleic acid is preferable.

In addition, coupling agent, polymer, etc. are also applicable, and the coupling agent includes titanate one, silica one, and aluminum one, while the polymer includes polyvinyl pyrrolidone and polyethylene glycol.

The dispersion medium 14 is a solution mixture, and solid at normal temperature, and low in mutual solubility in solid state, and has the melting point in the vicinity of the operational temperature, and is formed by mixing at least two kinds of organic compounds which are miscible at the temperature above the melting point and in a uniform liquid state.

More specifically, organic compounds which are high in polarity and have the melting point of 40 to 60° C. are applicable for one Group A, such as long chain alcohols such as hexadecyl alcohol and octadecyl alcohol, phenols such as phenol and cresol, aromatic ketones such as benzophenone and benzaldehyde, decanes, and dodecanoic acid. Organic compounds which are low in polarity and have the melting point of 40 to 60° C. are applicable for the other Group B, such as paraffin or waxes, and wax and saturated hydrocarbon mainly consisting thereof. The applicable dispersion medium 14 includes a mixture of two or more kinds of compounds including at least one kind from Group A and Group B.

The room temperature is the temperature in a room under a natural environment, or the temperature in a normally air-conditioned environment, and means the condition of the temperature lower than the temperature at which an electrophoretic phenomenon of the electrophoretic particles 12 can occur (for example, about 40° C.). In other words, it is the temperature at which no electrophoretic phenomenon occurs, for example, 0 to 30° C.

Next, a method for selecting the dispersion medium 14 will be described below.

As described above, the dispersion medium 14 is a mixture of two or more kinds of compounds including at least one kind of organic compounds in Group A high in polarity and at least one kind of organic compounds in Group B low in polarity.

The organic compounds included in Group A, and the organic compounds included in Group B are respectively miscible with each other. This means that, even when any two kinds of compounds are selected from either only Group A or Group B, the mixture has only one melting point, and becomes uniform liquid at the temperature not lower than the melting point thereof, and becomes uniform solid at the temperature lower than the melting point. However, the melting point of this mixture is determined by the melting point of the two kinds of mixed organic compounds, and the mixing ratio thereof.

On the other hand, in case of a mixed solvent obtained by selecting one kind of organic compound from Group A and Group B, respectively, miscibility in a solid state is low. This means that the mixture has two melting points, and becomes uniform liquid at the temperature not lower than the higher temperature of two melting points while two solid phases are co-existent in the mixture at the temperature lower than the lower melting point of the two melting points. These two melting points are close to each melting point of the two kinds of mixed organic compounds. In addition, a boundary area on which two kinds of different solid phase are brought into contact with each other is considerably large in the mixture with these two solid phases co-existent therein, and thus, the light scattering intensity is high, having a nature that the mixture is sensed as a solid phase of high white intensity for human eyes.

As described above, the dispersion medium 14 is changed into liquid when it is heated to a predetermined operational temperature above the melting point, and the electrophoresis of the electrophoretic particles 12 is ensured while it is solidified when cooled to normal temperature, and maintains the display content and emits white color with the position of the electrophoretic particles 12 fixed. For this purpose, the higher melting point out of the two melting points of the mixture solvent is preferably selected so as to be lower than the operational temperature for generating electrophoretic operation. In addition, the lower melting point out of these two melting points is above room temperature, for example, not lower than 40° C., and white intensity becomes maximum at the temperature below the lower temperature. Thus, the specific selection and the mixing ratio of the organic compounds from Group A and Group B used for the mixture solvent are determined from two conditions, i.e., a setting condition of the operational temperature and the cooling temperature requested for a display device and an optical condition for maximizing the white intensity.

Preferably white intensity can be obtained by setting the mixing ratio so that the weight ratio of the organic compound in Group A to the organic compound in Group B is 3 to 40%.

The state of the two kinds of solid phase is changed by the cooling temperature from the heated, melted and mixed condition. This means that the solid phase becomes coarse by rapid cooling, the boundary area becomes small, and the light scattering intensity becomes relatively small. On the other hand, by the gradual cooling, the solid phase becomes fine, the boundary area becomes large, and the light scattering intensity becomes relatively large. As a result, by varying the cooling speed to the normal temperature after the heating to generate electrophoretic operation, the masking ratio of the solid phase can be varied, and the white gradation can be displayed.

The thus-obtained mixture solvent is in a uniform liquid state at and above the operational temperature for performing the electrophoretic operation, and electrophoresis of the electrophoretic particles 12 can be obtained. When the solvent is cooled, it is changed into white solid, and the display device can displays either the color of the electrophoretic particles 12 or white color.

In addition, the whole inside of the micro capsule 5 is solidified, the display screen is not changed. Further, no problem of discoloration occurs at solidification because no dye is used, the display content of the display screen can be maintained (stored) for a long time, and the recyclable display device of long service life can be obtained.

In this condition, the dispersion medium 14 is solidified and transmissivity thereof is degraded. Thus, even when the electrophoretic particles 12 are located on the distal side viewed from the observation side, i.e., opposite to the observation side, it is difficult to recognize the display color of the electrophoretic particles 12 from the observation side through the dispersion medium 14. Thus, the contrast characteristic can be improved. Further, even when the display color of the electrophoretic particles 12 is black, the display color of the electrophoretic particles 12 can be reliably masked, necessity of considering the combination of the display color of the electrophoretic particles 12 with the display color of the dispersion medium 14 is reduced.

Next, a method for preparing the dispersion medium 14 will be described.

The weight percentage of the electrophoretic particles, the dispersing agent, and the mixture solvent is preferably 3–20%, 0.2–2%, and 75–93%, respectively. The weight percentage is thus determined in order to maximize the contrast of the particle color with white color of the solidified mixture solvent for the weight percentage of the electrophoretic particles 12, and in order to maximize the zeta potential for the weight percentage of the dispersing agent. The optimum values are determined by the condition of the specific combination of each component.

These three components are mixed by using a mixer such as a ball mill and a homogenizer. Mixing operation is performed for one to two hours at the temperature at or above the melting point on the high-temperature side of the mixture solvent, preferably, at 150–250° C.

The thus-prepared dispersive solution is contained (accommodated) in the micro capsule 5. The micro capsule 5 can be manufactured by, for example, an interfacial polymerization method, an interfacial deposition method, a phase separation method, or an interfacial precipitation method. The grain size of the micro capsule 5 is preferably 20–80 μm, preferably 40–60 μm so that surface protective effect and display stability can be obtained. The grain size of each micro capsule 5 is preferably uniform so as to prevent irregular display.

The dispersive solution obtained by the above-described operation and the micro capsule 5 containing the dispersive solution are uniformly disposed between the transparent electrodes 1 and 2 to form the electrophoretic layer 6.

Normal display characteristic can be maintained under the environment of the operational temperature by operating the electrophoretic display device of this configuration, and the display content is fixed, in other words, stored when the temperature is returned to the normal temperature. In this display maintaining condition at the normal temperature, the voltage need not be applied between the transparent electrodes 1 and 2, and the power required for maintaining the display content can be reduced.

In the above embodiment, a case in which two kinds of substances solid at normal temperature are used for the dispersion medium 14 is explained, but the embodiment is not limited thereto, but applicable to a case in which either one of the substances constituting the dispersion medium 14 is solid at normal temperature if movement of the electrophoretic particles 12 can be prevented.

In the above embodiment in which a substance of small mutual solubility is used for the dispersion medium 14. However, similar effect can be obtained even when the dispersion medium 14 is formed of a plurality of substances of different refractive index, and the visibility or the contrast characteristic can be improved by forming the dispersion medium of a plurality of substances of small mutual solubility and different refractive index.

In the above embodiment, a case in which the dispersive solution is stored in the micro capsule 5 is explained. However, the embodiment is not limited thereto, but, needless to say, it is applicable to a case in which bulkheads are disposed between the transparent electrodes 1 and 2, and the dispersive solution is sealed between the bulkheads.

Further, in the above-described embodiment, a case is explained in which an image or a letter is displayed by heating the whole electrophoretic layer 6 when performing the electrophoretic operation, controlling the voltage applied to the transparent electrodes 1 and 2 with the dispersion medium 14 in a liquefied state, and performing electrophoresis of the electrophoretic particles 12 to either side of the transparent electrodes 1 and 2 for each micro capsule 5, but not limited thereto. For example, electrophoretic operation can be performed in the target micro capsule 5 by heating only a part corresponding to the micro capsule 5 subjected to the electrophoretic operation, and applying the voltage thereto.

In the above embodiment, a heater, a hot air device, a thermal head, etc. is used for the heating means 18. However, these appliances may be externally attached to the electrophoretic display device, or may be built into the electrophoretic display device. When the heating means is externally attached to the electrophoretic display device, the whole of the electrophoretic layer is heated. However, if the heating means is built in the electrophoretic display device, only the part corresponding to the micro capsule 5 subjected to the electrophoretic operation may be heated, and the power consumption can be reduced.

In the above embodiment, the heating means 18 such as a heater, a hot air device and a thermal head is disposed in order to liquefy the dispersion medium 14 in the micro capsule 5. Similarly, a cooling means such as a heat sink and a heat exchanger for solidifying the dispersion medium 14 is disposed, and the cooling temperature or the cooling speed of the dispersion medium 14 may be adjusted thereby.

Still further, in the above embodiment, a case in which the embodiment is applied to the electrophoretic display device. The embodiment is not limited thereto, but, needless to say, applicable to a case in which the electrophoretic device is used. In particular, the electrophoretic device has excellent visibility and contrast characteristic, and display maintaining characteristic for a long time, and it is suitable for the electrophoretic display device.

EXAMPLES

Carbon black particles of 5 g having the grain size of 0.5 μm for the electrophoretic particles 12, oleic acid of 0.5 g for the dispersing agent, hexadecyl alcohol of 10 g having the melting point of 48° C. for the dispersion medium 14 and paraffin wax of 90 g having the melting point of 50° C. for the mixture solvent are heated and mixed for one hour under the condition of 200° C. by a homogenizer, and the dispersive solution was obtained.

The micro capsule 5 containing the dispersive solution having the grain size of 50 μm and formed of gum arabic was prepared by using an interfacial deposit method.

Next, two transparent sheets having conductive transparent electrodes (ITO film) thereon constituting the transparent electrodes 1 and 2 were prepared with the transparent electrode surfaces facing each other, and the micro capsule 5 prepared between these transparent electrode films was rolled by a roller so as not to damage micro capsule 5 and arrayed on a plane so as to realize the thickness of 50 μm. An electrophoretic display device having the configuration shown in FIG. 1 was manufactured.

The operational test was carried out for this electrophoretic display device.

When the voltage of 100V was applied between the transparent electrode 1 and the transparent electrode 2 by the voltage applying means 16 under a temperature condition at 55(C, the electrophoretic operation of the electrophoretic particles 12 was observed. Then, application of the voltage to the transparent electrodes 1 and 2 was stopped, and the electrophoretic display device was cooled down to 25(C. White color development by solidification of the mixture solvent of hexadecyl alcohol and paraffin wax was observed, and expression of desired letters, symbols and patterns could be confirmed. The contrast of the letters, symbols and patterns, i.e., the ratio of the reflected light intensity of the surface on which the mixture solvent was on the observation side to the surface on which the electrophoretic particles 12 were on the observation side was "8". Considering that the contrast of the letters used in newspapers is "4", it was confirmed that the function as the display device was satisfactory.

The value of the contrast was unchanged even when the display device has been left for one year in a condition at the room temperature (about 25(C). In addition, the electrophoretic operation under the temperature condition at 55(C and the cooling operation to 25(C were repeated by at least 1,000 times. However, the contrast of the letters, symbols and patterns under the temperature condition at 25(C was maintained at substantially "8", and degradation of the contrast associated with the repetitive operations was not found.

In the above embodiment, a case in which the micro capsule 5 is disposed between the pair of transparent electrodes 1 and 2 is explained. However, the embodiment is not limited thereto, but applicable to, for example, a case in which electrodes for applying the voltage to the micro capsule 5 are disposed so that surfaces thereof are located in the vertical direction.

Further, the embodiment is also applicable to a case in which the transparent electrodes 1 and 2 are disposed on a same base body via, for example, an insulating layer and charged pigment particles in the micro capsule are moved parallel to the surface of the base body.

In the above embodiment, an application to the electrophoretic display device was explained, but the embodiment is not limited thereto, but applicable to other electronic apparatuses. It is also applicable to a case in which a various kinds of non-linear elements such as a transistor and a thin film diode are formed, and further applicable to a substrate with these switching elements formed thereon.

Here, a case in which the electrophoretic device is applied to a mobile type personal computer, a cellular phone, a digital still camera, an electronic book, an electronic paper, an electronic notebook, and an electronic paper is explained with reference to FIGS. 2 to 8 as examples of applications to the electronic apparatuses.

FIG. 2 is a perspective view showing the configuration of the personal computer.

A personal computer 200 comprises a body unit 202 having a keyboard 201 and a display unit 203. In this personal computer 200, the display unit 203 comprises the above-described electrophoretic device.

FIG. 3 is a perspective view showing the configuration of a cellular phone.

A cellular phone 300 comprises a plurality of operation buttons 301, an ear piece 302, a mouth piece 303, and a display panel 304. In this cellular phone 300, the display panel 304 comprises the above-described electrophoretic device.

FIG. 4 is a perspective view showing the configuration of a digital still camera. Connection to external apparatuses is shown in a simplified manner.

A digital still camera 400 comprises a case 401, a display panel 402 which is formed on a back side of the case 401 to perform the display based on the image pickup signal by a CCD (Charge Coupled Device), a light receiving unit 403 including an optical lens, the CCD, etc. which is formed on the observation side (the back side in the figure) of the case 401, a shutter button 404, a circuit substrate 405 for transferring and storing the image pickup signal of the CCD when the shutter button 404 is pressed. In this digital still camera 400, the display panel 402 comprises the above-described electrophoretic device.

A video signal output terminal 406 and an I/O terminal 407 for data communication are disposed on a side of the case 401 in the digital still camera 400, and a TV monitor 406A is connected to the former, and a personal computer 407A is connected to the latter as necessary. The image pickup signal stored in a memory of the circuit substrate 405 is output to the TV monitor 406A and the personal computer 407A by predetermined operations.

FIG. 5 is a perspective view showing the configuration of the electronic book.

An electronic book 500 comprises a book-shaped frame 501 and a cover 502 openable/closable with respect to the frame 501, and a display device 503 with a display surface exposed and an operation unit 504 are disposed on the surface of the frame 501. In this electronic book 500, the display device 503 comprises the above-described electrophoretic device.

FIG. 6 is a perspective view showing the configuration of the electronic paper.

An electronic paper 600 comprises a body 601 comprising a rewritable sheet having similar mass and flexibility to paper, and a display unit 602. In this electronic paper 600, the display unit 602 comprises the above-described electrophoretic device.

FIG. 7 is a perspective view showing the configuration of the electronic notebook with the electronic paper in FIG. 6 applied thereto.

An electronic notebook 700 comprises a cover 701, and a plurality of bundled electronic paper 600 held by the cover 701, and the display content in the electronic paper can be changed with the electronic paper 600 in a bundled condition by providing a display data inputting means on the cover 701. In this electronic notebook 700, the electronic paper 600 comprises the above-described electrophoretic device.

FIG. 8 shows another configuration of an electrophoretic display device 800 having the electronic paper in FIG. 6, and (a) is a sectional view and (b) is a plan view.

The electrophoretic display device 800 comprises a body unit 801 having two sets of carrying roller pairs 802*a* and 802*b*, the electronic paper 600 installed on the body unit 801 while held by the carrying roller pairs 802*a* and 802*b*, a transparent glass sheet 804 fitted to a rectangular hole 803 made in a display surface side (an upper surface side in FIG. 8(*a*)) of the body unit 801, an insertion port 805 which is provided in one end of the body unit 801 for inserting the electronic book 600 in an attachable/detachable manner to/from the body unit 801, a controller 808 connectable to a terminal unit 806 provided on a tip part in the inserting direction of the electronic paper 600 via a socket 807, and an operation unit 809. In this display 800, the electronic paper 600 comprises the above-described electrophoretic device.

This electrophoretic display device 800 constitutes a display surface by visually recognizing the electronic paper 600 installed on the body unit 801 on the transparent glass sheet 804. The electronic paper 600 is installed on the body unit 801 in an attachable/detachable manner, and can be detached from the unit body 801 and used in a portable mode.

The electronic apparatuses are not limited thereto, but include a TV, view finder type and monitor direct view type video taper recorders, a car navigation device, a pager, an electronic memo, an electric calculator, a word processor, a work station, a TV telephone, a POS terminal, and apparatuses having a touch panel, and the above-described electrophoretic device is applicable for a display unit of the above-described electronic apparatuses.

Advantages

As described above, in the present invention, a plurality of substance of low mutual solubility are used for the dispersion medium for dispersing the electrophoretic particles, and the degree of transmission of the electrophoretic particles can be reduced when the electrophoretic particles are present on the distal side viewed from the observation side, and the visibility and the contrast characteristic can be further improved.

In particular, the dispersion medium is formed of a plurality of substances containing at least one substance which is non-fluid at normal temperature and fluid at non-normal temperature, and thus, the position of the electrophoretic particles can be easily maintained for a long time by maintaining the dispersion medium at normal temperature, and the electrophoretic device free from any degradation such as discoloration of the display color and long in service life can be obtained.

Dispersibility of the electrophoretic particles in the dispersive solution can be improved by mixing the dispersing agent in the electrophoretic dispersive solution, the electrophoretic speed of the electrophoretic particles when applying the voltage can be increased to realize the rapid display speed.

What is claimed is:

1. An electrophoretic device comprising:

an electrophoretic layer containing a dispersion medium and electrophoretic particles dispersed in the dispersion medium, the position of the electrophoretic particles controlled according to an electric potential applied to electrodes proximate the electrophoretic particles;

the dispersion medium being a mixture of a plurality of substances, a mutual solubility of the substances being low.

2. The electrophoretic device according to claim 1, wherein at least one of the plurality of substances is non-fluid at a normal temperature, and fluid at a non-normal temperature.

3. The electrophoretic device according to claim 2 further comprising a heating means for heating the dispersion medium.

4. The electrophoretic device according to claim 2 further comprising a cooling means for cooling the dispersion medium.

5. The electrophoretic device according to claim 2 wherein further comprising means for applying an electric potential to the electrodes with the electrophoretic layer in a non-normal temperature condition.

6. The electrophoretic device according to claim 1, wherein the plurality of substances have different refractive indices.

7. The electrophoretic device according to claim 1, wherein the dispersion medium further comprises a mixture of at least one kind of substance selected among long chain alcohols including hexadecyl alcohol and octadecyl alcohol, phenols including phenol and cresol, aromatic ketones including benzophenone and benzaldehyde, decanes, and dodecanes, with at least one kind of substance selected among paraffin, waxes, or waxes mainly consisting of waxes, and saturated hydrocarbons.

8. The electrophoretic device according to claim 1, wherein the dispersion medium contains a dispersing agent.

9. The electrophoretic device according to claim 1, wherein the dispersion medium with the electrophoretic particles dispersed therein is sealed in an area demarcated by bulkheads disposed between the electrodes.

10. The electrophoretic device according to claim 1, wherein the dispersion medium with the electrophoretic particles dispersed therein is contained in a micro capsule, and sealed between the electrodes.

11. The electrophoretic device according to claim 10, wherein the micro capsule is disposed uniformly thick and flat between the electrodes.

12. An electronic apparatus comprising:

a display body; and a driving circuit feeding a drive signal to the display body, the display body including an electrophoretic device according to claim 1.

13. In an electrophoretic device in which an electrophoretic layer containing a dispersion medium and electrophoretic particles dispersed in the dispersion medium is disposed between a pair of electrodes, the improvement comprising:

the dispersion medium being a mixture of a plurality of substances, a mutual solubility of the substances being low.

14. A driving method for an electrophoretic device including an electrophoretic layer containing a dispersion medium and electrophoretic particles dispersed in the dispersion medium, the position of the electrophoretic particles being controlled according to an electric potential applied to electrodes proximate the electrophoretic particles, the method comprising:

providing the dispersion medium as a mixture including a plurality of substances, the mixture being a fluid at an electrophoretically operational temperature and an optically opaque solid at a temperature lower than the electrophoretically operational temperature; and applying the electric potential to the electrodes with the temperature of the electrophoretic layer being set to the electrophoretically operational temperature.

15. A method for driving an electrophoretic device including an electrophoretic layer disposed between a pair of electrodes, the electrophoretic layer containing a dispersion medium and electrophoretic particles dispersed in the dispersion medium; the method comprising:

providing the dispersion medium as a mixture including a plurality of substances, the mixture being a fluid at an electrophoretically operational temperature for performing an electrophoretic operation in the electrophoretic layer, and an optically opaque solid at a temperature lower than the electrophoretically operational temperature; and applying an electric potential to the electrodes with the temperature of the electrophoretic layer being set to the electrophoretic operational temperature.

16. An electrophoretic device comprising:

a dispersion medium; and a plurality of electrophoretic particles contained in the dispersion medium;

wherein the dispersion medium includes a plurality of substances and boundaries are formed between the substances such that light incident thereon scatters.

17. The electrophoretic device according to claim 16, wherein the dispersion medium has a plurality of melting points.

18. The electrophoretic device according to claim 17, wherein at least one of the plurality of melting points is above 40° C.

19. The electrophoretic device according to claim 19, wherein a voltage is applied while a temperature of the dispersion medium is above the one of the melting points.

20. The electrophoretic device according to claim 16, wherein one of the substances is selected from a group consisting of long chain alcohols including hexadecyl alcohol and octadecyl alcohol, phenols including phenol, cresol, aromatic ketones including benzophenone and benzaldehyde, decanes, and dodecanes, and wherein another of the substances is selected from a group consisting of paraffin, waxes, and waxes mainly consisting of waxes, and saturated hydrocarbons.

21. The electrophoretic device according to claim 16, wherein the dispersion medium contains a dispersing agent.

22. The electrophoretic device according to claim 16, further comprising bulkheads forming areas in which the dispersion medium and the electrophoretic particles are sealed.

23. The electrophoretic device according to claim 16, further comprising microcapsules containing the dispersion medium and the electrophoretic particles.

24. An electrophoretic device comprising:

a dispersion medium; and a plurality of electrophoretic particles contained in the dispersion medium;

wherein the dispersion medium includes a plurality of substances, each of which has a different refractive index.

* * * * *

UNITED STATES PATENT AND TRADEMARK OFFICE
CERTIFICATE OF CORRECTION

PATENT NO. : 6,788,450 B2
DATED : September 7, 2004
INVENTOR(S) : Hideyuki Kawai et al.

It is certified that error appears in the above-identified patent and that said Letters Patent is hereby corrected as shown below:

Column 7,
Line 15, "displays" should be -- display --.

Column 9,
Lines 31 and 49, "55(C" should be -- 55°C --
Lines 34, 50 and 52, "25(C" should be -- 25°C --
Line 48, "25(C)" should be -- 25°C --

Column 10,
Line 4, delete "a"

Column 11,
Line 37, "taper" should be -- tape --

Column 14,
Line 7, "claim 19" should be -- claim 18 --

Signed and Sealed this

Twelfth Day of July, 2005

JON W. DUDAS
*Director of the United States Patent and Trademark Office*